United States Patent [19]

Terrasi

[11] Patent Number: 5,728,414
[45] Date of Patent: Mar. 17, 1998

[54] FOOD PRODUCT PACKAGE

[75] Inventor: Giuseppe Terrasi, Benevello (Cuneo), Italy

[73] Assignee: Soremartec s.a., Belgium

[21] Appl. No.: 725,918

[22] Filed: Oct. 4, 1996

[30] Foreign Application Priority Data

Oct. 16, 1995 [CH] Switzerland ............... 2924/95

[51] Int. Cl.⁶ ........................................ A23G 1/00
[52] U.S. Cl. ................... 426/104; 426/90; 426/132; 426/138
[58] Field of Search ............... 426/104, 120, 426/138, 89, 90, 100, 132

[56] References Cited

U.S. PATENT DOCUMENTS

| | | | |
|---|---|---|---|
| 309,644 | 12/1884 | Neuhausen | 426/138 X |
| 1,524,367 | 1/1925 | Papageorge | 426/138 X |
| 2,882,170 | 4/1959 | Stewart | 426/104 X |
| 2,975,547 | 3/1961 | Greve | 426/104 X |
| 3,085,883 | 4/1963 | Collier | 426/104 |
| 3,165,252 | 1/1965 | Carter et al. | 426/104 X |
| 3,607,308 | 9/1971 | Dubble | 426/104 X |
| 4,001,440 | 1/1977 | Hoyt | 426/104 |
| 4,417,613 | 11/1983 | Ryan et al. | 150/52 |
| 4,762,232 | 8/1988 | Sedutto et al. | 426/383 X |
| 4,765,501 | 8/1988 | Kao | 220/4 B |
| 4,794,008 | 12/1988 | Schmidt et al. | 426/234 |

FOREIGN PATENT DOCUMENTS

| | | |
|---|---|---|
| 9301046 | 8/1994 | Brazil . |
| 0211079 | 2/1987 | European Pat. Off. . |
| 0712579 | 5/1996 | European Pat. Off. . |
| 539769 | 6/1922 | France . |
| 602002 | 3/1926 | France . |
| 835498 | 12/1938 | France . |
| 1203203 | 1/1960 | France . |
| 1354750 | 6/1964 | France . |
| 2495582 | 6/1982 | France . |
| 8907799 | 12/1989 | France . |
| 2666966 | 3/1992 | France . |
| 1255468 | 11/1967 | Germany . |
| 2935691 | 3/1981 | Germany . |
| 4010003 | 10/1991 | Germany . |
| 4205941 | 10/1992 | Germany . |
| 29518414 | 1/1996 | Germany . |
| 163428 | 3/1974 | Italy . |
| 2021180 | 7/1990 | Russian Federation . |
| 624931 | 6/1949 | United Kingdom . |
| 1381579 | 1/1975 | United Kingdom . |
| 2277511 | 11/1994 | United Kingdom . |
| 2279286 | 1/1995 | United Kingdom . |
| 8905764 | 6/1989 | WIPO . |
| 93/00267 | 1/1993 | WIPO ........... 426/104 |
| 9521105 | 8/1995 | WIPO . |

OTHER PUBLICATIONS

Database WPI, Derwent Publications Ltd., London GB, AN 94-303435, XP002023434, abstract BR9301046, 23 Aug. 1994.

Cacao, Chocolade, Suikerwerken, vol. 25, No. 2, Feb. 1957, pp. 62-63, XP002023433.

*Primary Examiner*—Milton Cano
*Attorney, Agent, or Firm*—Rothwell, Figg, Ernst & Kurz

[57] ABSTRACT

A food product package comprises two half shells having respective mouths in face-to-face relation. One of the half shells defines an edible part of the package. The other half shell defines a receptacle for play elements.

23 Claims, 2 Drawing Sheets

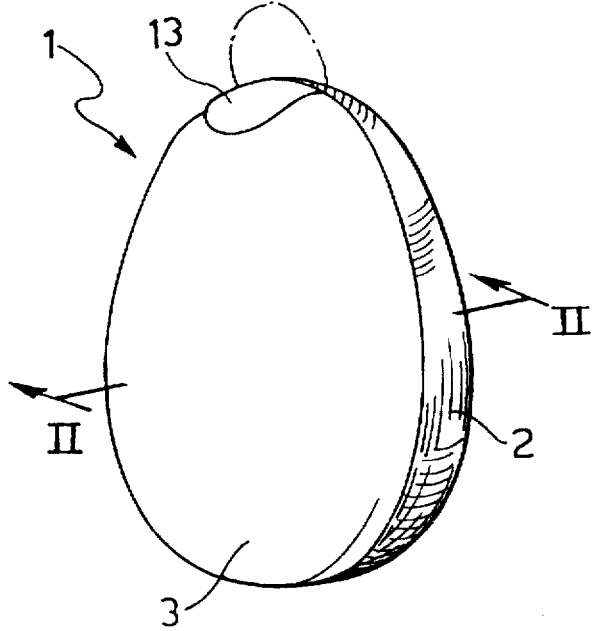
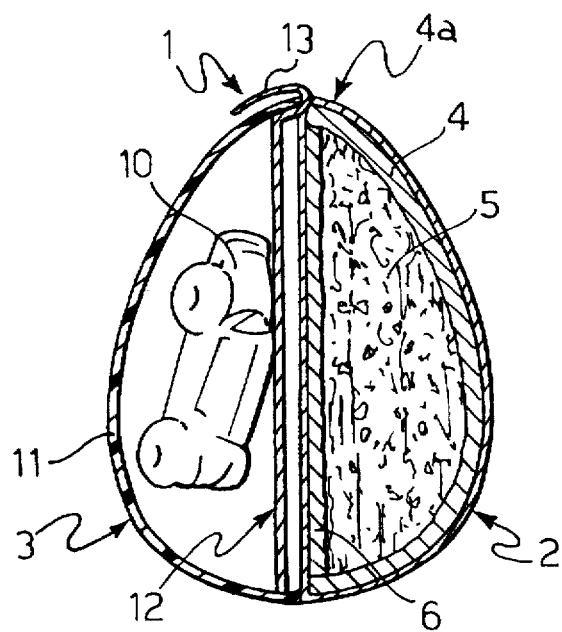
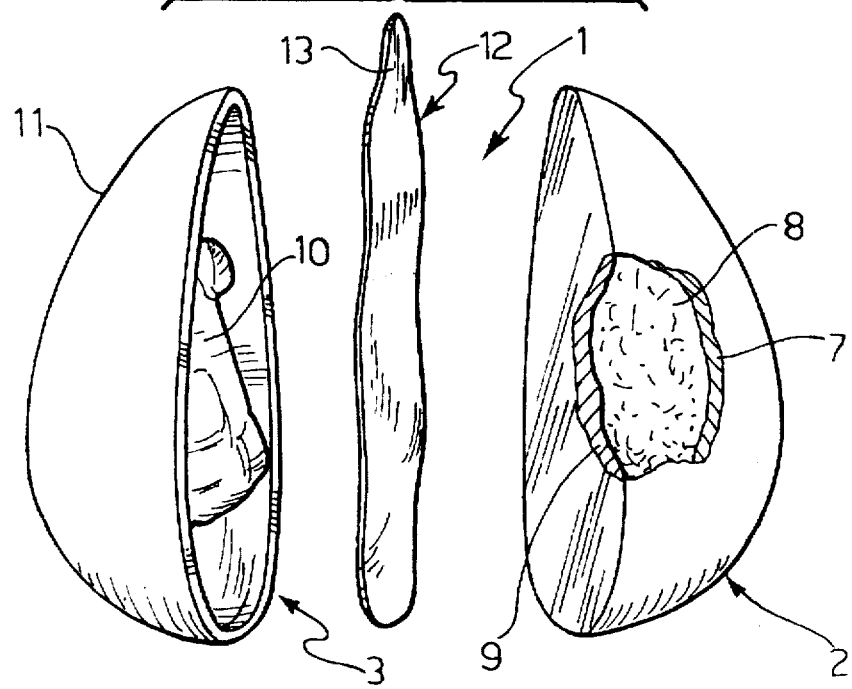

FOOD PRODUCT PACKAGE

DESCRIPTION

The present invention concerns a food product package comprising two half shells with their respective mouths joined in face-to-face relation and with at least one receptacle for an accessory such as, for example, a play element.

A package of this type is known, for example, from IT-U-163428.

In packages of the aforesaid type, the two half shells are usually chocolate half shells and the receptacle is a capsule or casing, usually formed from plastics material and disposed within the cavity defined by the two half shells in their coupled position.

In this capsule or casing there may be disposed a play element such as, for example, a small toy which may be assembled from a plurality of pieces, jewellery etc.: in this sense, the term "accessory" as used in the present description and/or in the following claims is to be given its widest interpretation so as to include, for example, any object which can be used as a "surprise" in association with a food product such as, for example, a confectionery product and/or accessories such as a so-called "spreader" for spreading a creamy product, for example, on a slice of bread.

The primary aim of the present invention is that of facilitating the process for manufacturing the package.

Secondly, the present invention aims to make the method by which a package of the aforesaid type is produced more flexible, especially as regards the characteristics of the edible part of the package.

More generally, the present invention aims further to expand the play characteristics of a package such as that described above.

According to the present invention, this aim is achieved by virtue of a food product package having the characteristics specifically referred to in the following claims.

The invention will now be described purely by way of non-limitative example, with reference to the accompanying drawings, in which:

FIG. 1 is a perspective view of a food product package according to the invention;

FIG. 2 is a sectional view taken on the line II—II of FIG. 1 of a first possible embodiment of a package according to the invention;

FIG. 3 is an exploded perspective view of a first possible embodiment of a package according to the invention.

Figure 4:
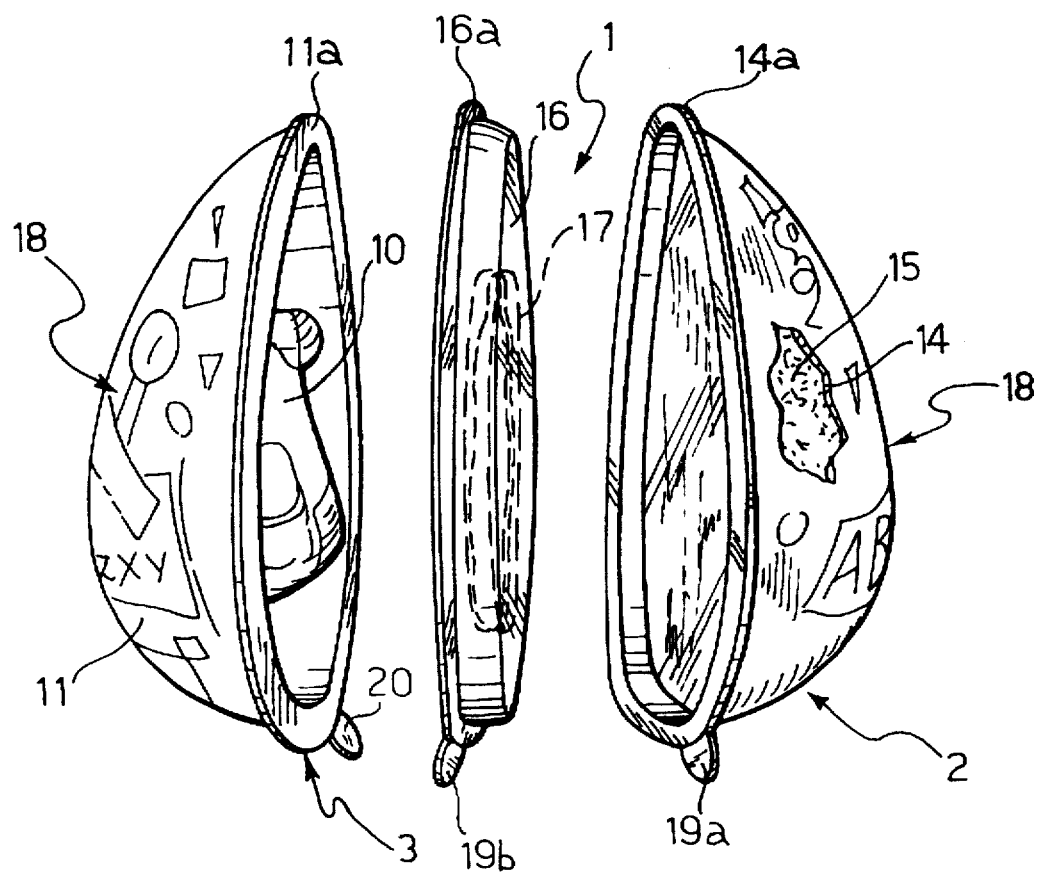
FIG. 4 is another exploded perspective view of a further possible embodiment of a package according to the invention.

In the drawings the reference numeral 1 indicates in its entirety a food product package which can be used, in particular, in association with confectionery products. This indication of possible use is not, however, to be interpreted as a limitation on the scope of the invention.

Specifically, the term "package" has been used here to indicate an assembly comprising both edible and inedible parts joined together to form a defined and independent article.

In the embodiment to which the drawings refer, the package 1 is shaped essentially as an egg, for example, an egg having the dimensions of a hen's egg, in which two half shells (half ovals in the embodiment illustrated) can be distinguished, indicated with the reference numerals 2 and 3 respectively.

In the embodiment illustrated here, the two half shells 2 and 3 have approximately identical dimensions and are therefore intended to be joined together in face-to-face relation at their likewise oval mouths.

The invention therefore lends itself to the use of different shapes, with half shells having, for example, spherical, polyhedral shapes etc. and/or half shells having sizes and shapes which differ from each another.

For example, while maintaining the overall egg shape, the two half shells 2 and 3 could be formed in such a way that, once they are joined together, one half shell forms the lower or base end, and the other forms the head or top end of the egg shape. This is irrespective of which of the two half shells (that is, the base or the head), constitutes and/or contains the edible part of the package.

While the overall appearance of the assembled package (illustrated in FIG. 1) remains substantially the same, the embodiments shown in FIGS. 2 to 4 can be differentiated between primarily as regards the characteristics of the first half shell 2, intended to constitute and/or contain, the edible part of the package.

In the embodiment shown in FIG. 2, the half shell 2 essentially comprises a shell-shape body 4 of wafer which contains a filling such as, for example, a hazelnut-flavour cream 5, and which is closed by a layer 6 in the form of a closure, also formed from a wafer material, which extends across its mouth. The outline of the layer 6 corresponds to the internal shape of the mouth of the shell 4 and therefore ensures the closure thereof and the consequent protection of the creamy filling 5 from the external environment.

The assembly thus formed (which may be achieved using known techniques which do not require illustration as they are not in themselves relevant to understanding the invention) is then covered ("enrobed") with a layer of cream 4a, for example, chocolate-flavoured cream.

In the embodiment shown in FIG. 3, the reference numeral 7 indicates a shell-shape body formed from chocolate or similar material and containing a creamy filling 8 (analogous to the creamy filling 5 shown in the embodiment of FIG. 2). In this case also, the mouth of the shell-shape body 7 containing the filling 8 is closed by a layer 9 in the form of a cover having an oval periphery. In this case, the layer 9 is also formed from chocolate or similar material, applied to the mouth part of the shell-shape body 7 and welded thereto (using known techniques) so as to isolate the filling 8 from the external environment.

In the further embodiment shown in FIG. 4, the half shell 2 instead includes a shell-shape body 14 formed from an inedible material (or non-food, the two terms here being used synonymously), such as, typically, moulded plastics material which is compatible for contact with food products. The body 14 contains a creamy filling 15 (analogous to the fillings 5 and 8 in the embodiments shown in FIGS. 2 and 3), as well as possibly a layer similar to or the same as the layers 6 and 9 actually retaining the filling. In this case also, the mouth of the shell-shape body 14, which mouth has, in this case, a flanged edge 14a which projects towards the outside of the half shell 2, is closed by a layer or seal 16 in the form of a cover and which acts as a diaphragm formed, for example, from plastics material having an ovoid peripheral shape. In this case, the diaphragm 16 constitutes the bottom of a shallow cup-shape body provided around the rim of its mouth with a flange 16a, likewise of ovoid shape and joinable (for example, by heat welding) to the corresponding edge 14a of the shell-shape body 14 to seal the creamy filling 15 within the half shell 2.

3

In any case, the presence of a layer or diaphragm which separates the edible part from the accessory 10, regardless of how the layer or diaphragm is made, allows the edible material to be held in position even if it is, or becomes fluid (for example, due to heat-induced softening).

It is understood that the embodiment shown in FIG. 2, as well as the embodiments shown in FIGS. 3 and 4 are intended purely by way of example. While maintaining the objective of forming a half shell which defines the edible part of the package 1 (possibly itself comprising an edible element, as in the embodiment shown in FIGS. 2 and 3), the possible embodiments are practically infinite: praline structures with paste or cream fillings, possibly containing dried fruit, liquid or syrup centres, etc. can be mentioned as examples.

In all of the embodiments shown in FIGS. 2 to 4, the half shell 3 is intended to define the receptacle for an accessory 10 comprising, for example, one or more play elements such as a small toy, an accessory such as a "spreader" (reference should be made to the statement of terminology given in the introduction to the present description for the meaning of the term "accessory"). FIG. 4 shows how, as an alternative to being located in the half shell 3, such a "spreader" (indicated 17) may be formed from a part that is integral or associated with the diaphragm 16, and formed by, for example, thermoforming. The part of the diaphragm 16 forming the spreader 17 may be removed from the diaphragm by breaking one or more projections which attach it to the diaphragm 16. Where the spreader 17 is a part associated with the diaphragm 16, this part is usually situated on the side of the diaphragm 16 opposite the food mass 15. The half shell 3 is here formed essentially from a shell-shape body 11 made from an inedible material (for example, a half shell of moulded plastics material). In the embodiments shown in FIGS. 2 and 3 the mouth of the body 11 is closed by a layer 12 to prevent the play element 10 accidentally falling out. This may be, for example, an aluminium foil or any other sheet material of the type currently used for the production of seals in the food industry, applied (preferably welded) over the opening in the body 11. It is such that it can be easily torn and/or removed by the user, for example, by pulling on a tongue 13, so as to uncover completely or partly the mouth of the body 11 to gain access to the play elements 10 and remove them from the package 1. The embodiment shown in FIG. 4 shows how the layer 12 can be superfluous due to the presence of the layer 16. By being joined with its edge 16a to the peripheral edge 14a of the body 14 of the half shell 2 and to a corresponding peripheral flange 11a of the body 11 (this is usually achieved by heat welding from above the preparation of the package), the layer 16 can, in fact, act as a closure for both of the half shells.

The system for closing the package illustrated in FIG. 4, created by means of appropriate projections 11a, 14a, 16a projecting around the periphery of the coupling zone, may be formed in such a way as to allow, first, the half shell 3 containing the play element to be opened and, only then, the half shell 2 containing the edible mass to be opened. This is achieved by positioning the opening tab 19a of the half shell containing the food mass over the tab 19b of the layer or diaphragm 16, in such as way that these two superimposed tabs 19a, 19b are off-set with respect to the tab 20 provided on the other half shell.

In this way, a person opening the package is able to grip the superimposed tabs 19a, 19b with one hand and the tab 20 with the other hand, then move the hands apart. The half shell 3 is thus separated from the half shell 2 which is, however, securely closed by the layer or diaphragm 16. This

4 can then be removed from the half shell 2 by pulling the tabs 19a and 19b apart.

The system by which the half shell 2,3 and the layer 16 are joined may vary, but must have the characteristic of being easy to open. Purely by way of example, the layer 16 may be releasably welded to the half shell 2 containing the food mass or, instead, may be joined by release means to the half shell 3 containing the play element 10. A further example could be that the layer 16 is releasably connected to the inside of the half shall 2 containing the food mass, with the two half shells 2,3 being joined together by releasable welding.

Naturally, the principle of the invention remaining the same, the details of construction and the embodiments may be widely varied with respect to what has been described and illustrated, without departing from the ambit of the present invention. This refers in particular to numerous constructional details of the half shells 2 and 3 illustrated with reference to the different possible embodiments shown in FIGS. 2 to 4; these details may be freely varied and transferred between different embodiments. In particular, although in both of the embodiments shown in FIGS. 2 and 3, the mouths of the half shells 2 and 3 are both closed (the half shell 2 by the layers 6 and 9 of edible material, and the half shell 3 by the layer 12 of sheet material), this embodiment, although preferred, is not in any way imperative. The half shell 2 may, in fact, be simply a hollow half shell formed from food material, having no filling, and therefore without needing its mouth to be closed.

Similarly, the presence of the seal 12, although preferred in order to make the half shell 3 a unit which may be handled, especially during the production of the package, without the risk that the play elements 10 will accidentally fall out, is not obligatory. The half shell 3 may, in fact, be formed without an associated closure, as seen in the embodiment shown in FIG. 4, by using the closure (the layer 16) which closes the other half shell 2 to close the mouth of the half shell 3. Conversely, an inedible closure associated with the half shell 3 may close the mouth of the half shell 2.

The food mass contained in the package may also comprise products of different formulation, for example, a dark chocolate coupled with a milk chocolate arranged in lines, spirals or droplets supported by and, possibly, upwardly delimited by a wafer which has the function of containing the product below, with the intention of giving to the consumer the effect of eating "bread and chocolate".

All of these possible variants, and others which are available to an expert in the field, are naturally included in the scope of the present invention.

Preferably, once the package 1 has been formed as the embodiment illustrated in FIG. 1, it may be further processed, for example, by being covered with a covering or wrapping made of sheet material such as an aluminium foil etc.: this is achieved in accordance with current methods used in the food industry. Conversely, the embodiment shown in FIG. 4 (both of the half shells 2 and 3 being externally delimited by shell-shape bodies formed from inedible material) has the further advantage that the two shell-shape bodies 11 and 14 may themselves define the outer surface of the package with their convex surfaces which carry decorative and/or identifying information 18 relating to the product thereon, without the need for further packaging operations.

What is claimed is:

1. A food package comprising:
    two half shells with respective mouths coupled in face-to-face relation and with at least one receptacle for an accessory including a first half shell comprising an edible part of the package and a second half shell formed from a non-food material defining said receptacle for said accessory.

2. The package of claim 1, wherein said first half shell is constituted by a body of food material.

3. The package of claim 1, wherein said first half shell is formed from a non-food material and contains food material.

4. The package of claim 3, wherein said first and second half shells have external printed material thereon.

5. The package of claim 1, wherein said half shells are joined together to define a product which is substantially oval in shape.

6. The package of claim 1, wherein said half shells have approximately identical dimensions.

7. The package of claim 1, wherein at least one of said half shells includes a shell-shape body having a mouth closed by a seal.

8. The package of claim 7, wherein said seal is formed from a layer of material selected from the group consisting of aluminum and plastics.

9. The package of claim 7, further including means for removing or rupturing said seal.

10. The package of claim 9, wherein said removing or rupturing means comprises a tongue extending from the seal.

11. The package of claim 7, wherein said seal has a projecting peripheral edge attached to a corresponding projecting edge of the associated shell-shape body.

12. The package of claim 7, wherein said accessory comprises an accessory for spreading creamy products and is associated with and selectively removable from said seal.

13. The package of claim 7, wherein the mouth of said first half shell is closed by a seal, said seal being openable in order to gain access to the edible part only after said first and second half shells have been separated.

14. The package of claim 13, wherein said first half shell and the seal which closes the mouth thereof have superimposed opening tabs, and said second half shell has an associated opening tab which is off-set with respect to said superimposed opening tabs.

15. The package of claim 14, wherein said superimposed opening tabs are in their turn separable in order to allow the seal to be removed from said first half shell.

16. The package of claim 1, wherein said first half shell includes a shell-shape body formed from an edible material and the mouth is closed by a closure formed from a similar edible material.

17. The package of claim 16, wherein said shell-shape body and said closure are formed from the same edible material.

18. The package of claim 16, wherein said shell-shape body of said first half shell is formed from a wafer material.

19. The package of claim 18, wherein said first half shell has an outer coating of chocolate.

20. The package of claim 16, wherein said shell-shape body of said first half shell is formed from chocolate.

21. The package of claim 1, wherein said first half shell contains a filling.

22. The package of claim 21, wherein said filling is a creamy filling.

23. The package of claim 1, wherein said accessory comprises an accessory for spreading creamy products.

* * * * *